United States Patent [19]

Kono et al.

[11] Patent Number: 4,810,042
[45] Date of Patent: Mar. 7, 1989

[54] BRAKE PRESSURE CONTROL APPARATUS

[75] Inventors: Teruhisa Kono; Koichi Hashida, both of Hyogo, Japan

[73] Assignee: Sumitomo Electric Industries, Ltd., Osaka, Japan

[21] Appl. No.: 199,934

[22] Filed: May 27, 1988

[30] Foreign Application Priority Data

May 29, 1987 [JP] Japan ................. 62-137139

[51] Int. Cl.⁴ ............................................. B60T 8/94
[52] U.S. Cl. ........................................ 303/92; 60/545; 303/114
[58] Field of Search .............. 60/345; 303/9.63, 92, 303/102, 103, 110, 111, 113, 114, 115, 119

[56] References Cited

U.S. PATENT DOCUMENTS

| 4,637,662 | 1/1987 | Brown | 303/92 X |
| 4,641,893 | 2/1987 | Sato et al. | 303/113 |
| 4,753,490 | 6/1988 | Belart et al. | 303/114 |
| 4,761,042 | 8/1988 | Seibert et al. | 303/92 |

FOREIGN PATENT DOCUMENTS 57-104449  6/1982  Japan .

Primary Examiner—Duane A. Reger
Attorney, Agent, or Firm—W. G. Fasse; D. H. Kane, Jr.

[57] ABSTRACT

A brake pressure control apparatus comprises a master cylinder (2), an auxiliary hydraulic power source (10), a booster (3), a comparator member (30), an inlet valve (28), a pressure raising member (31) and a limiter member (32). The comparator member (30) determines whether a fluid pressure in a fluid path connecting a boost chamber of the booster (3) with wheel brakes (8 and 9) is lower than a predetermined value. The inlet valve (28) cuts off flow of the fluid toward the wheel brakes (8 and 9) when it is determined that the fluid pressure in the fluid path connecting the boost chamber with the wheel brakes (8 and 9) is lower than the predetermined value. The pressure raising member (31) raises a brake pressure to be applied to the wheel brakes (8 and 9), based on a fluid pressure from the master cylinder. The limiter member (32) limits operation of the pressure raising member (31). Thus, the pressure raising member (31) is enabled to operate only when the fluid pressure in the fluid path between the boost chamber and the inlet valve (28) is lower than the predetermined value at the time of cutoff by the inlet valve (28).

11 Claims, 6 Drawing Sheets

BRAKE PRESSURE CONTROL APPARATUS

BACKGROUND OF THE INVENTION

1. Field of the Invention

This invention relates to a brake pressure control apparatus for controlling a brake pressure for wheel brakes of a vehicle.

2. Description of the Prior Art

Well-known apparatus for brake pressure control adopt a system of antilock control or traction control for wheel brakes of a vehicle using an auxiliary hydraulic power source for constantly keeping a high pressure to be applied as an auxiliary hydraulic pressure. It is also known to use a hydraulic booster making use of an auxiliary hydraulic pressure from an auxiliary hydraulic power source in place of a conventional vacuum type booster. Such a hydraulic booster can be easily made to be small-sized and to have a high multiplying factor and it can be combined with a master cylinder and an antilock control device to form a unitary body, which can be easily attached to a vehicle.

It is known that in the case of using a hydraulic booster, a system is adopted in which pressure is applied to a specified wheel brake by using a dynamic fluid having a boosted pressure created in a boost chamber of the hydraulic booster, not using a static fluid through a master cylinder as in other conventional systems. For example, Japanese Patent Laying-Open No. 104449/1982 discloses a pressure control mechanism of a brake operating cylinder, in which an antilock device associated with the dynamic fluid comprises an intake valve to be operated for communication between a boost chamber and a specified wheel brake, and a discharge valve for discharging the dynamic fluid from the wheel brake to a reservoir. In such a manner, the master cylinder does not move beyond a specified distance in the stroke in a repressurization process of antilock, as is different from the case of using the static fluid and thus the antilock device for the dynamic fluid can be constructed in a very simplified manner.

The brake system using the conventional vacuum type booster involves a disadvantage that a leg-power needs to be increased when a failure occurs in a front wheel brake circuit to which the greater part of the brake force is applied. In order to eliminate the disadvantage, a brake system using a hydraulic booster as described above uses a tandem type master cylinder, for example, in the case of a front-engine front-wheel drive car, in which pressures of the two chambers of the master cylinder are applied to the respective front wheel brakes and the pressure through the booster is applied to the rear wheel brakes. In the case of a front-engine rear-wheel drive car, a single type master cylinder is used, so that the pressure through the master cylinder is applied to the front wheel brakes and the pressure through the booster is applied to the rear wheel brakes.

However, in the above described brake system using the hydraulic booster, it becomes impossible to apply the pressure to the rear wheel brakes when the auxiliary hydraulic power is no longer applied as a result of a failure in the auxiliary hydraulic power source, or when a failure occurs in the rear wheel brake circuit. In such a case, the boosting function of the booster is lost and a leg-power necessary for a sufficient working of the brakes should be increased. As a result, vehicles to which the above described brake system using the hydraulic booster is applicable are limited to those having light weight.

To solve the above described problems, it may be considered to use a method for ensuring the boosting function by cutoff of a fluid path between the boost chamber and the rear wheel brakes when a pressure switch for monitoring the pressure of the auxiliary hydraulic power source detects lowering of the auxiliary hydraulic pressure due to a failure in the rear wheel brake circuit. However, even in such a method, it becomes impossible to apply pressure to the rear wheel brakes, when a failure occurs in the auxiliary hydraulic power source itself and the booster is not operated normally.

SUMMARY OF THE INVENTION

Therefore, an object of the present invention is to provide a brake pressure control apparatus which can solve the above described difficulties.

The brake pressure control apparatus according to the present invention comprises:

a master cylinder driven by a leg-power applied to a brake pedal, for applying pressure to a first wheel brake;

an auxiliary hydraulic power source for sucking a fluid from a reservoir and storing it constantly under a prescribed pressure to be applied as an auxiliary hydraulic pressure;

a booster having a boost chamber, for connecting the boost chamber with the reservoir when the brake pedal is not operated, and for receiving the auxiliary hydraulic pressure from the auxiliary hydraulic power source when the brake pedal is operated, causing the pressure to be boosted in the boost chamber in proportion to a leg-power, whereby the boosted pressure is applied to increase a thrust of the master cylinder caused by the leg-power and it is also applied to a second wheel brake;

comparator means having one end connected to a fluid path communicating with the master cylinder and the other end connected to a fluid path between the boost chamber and the second wheel brake, to compare fluid pressures at both ends, so that it is determined whether the fluid pressure in the fluid path between the boost chamber and the second wheel brake is lower than a predetermined value;

cutoff means disposed in the fluid path between the boost chamber and the second wheel brake, for cutting off flow of the fluid from the boost chamber to the second wheel brake when it is determined that the fluid pressure in the fluid path between the boost chamber and the second wheel brake is lower than the predetermined value;

pressure raising means having one end connected to a fluid path communicating with the master cylinder and the other end connected to a fluid path between the cutoff means and the second wheel brake, for raising the brake pressure to be applied to the second wheel brake based on the pressure from the master cylinder when it moves toward the other end upon receipt of the pressure from the master cylinder at the one end; and limiter means for limiting operation of the pressure raising means to enable the pressure raising means to be operated only when the flow of the fluid is cutoff by the cutoff means and the fluid pressure in the fluid path between the boost chamber and the cutoff means is lower than the predetermined value.

When the fluid pressure in the fluid path for between the boost chamber and the second wheel brake becomes lower than the predetermined value, the comparator means detects the state. Then, the cutoff means cuts off the flow of the fluid from the boost chamber to the second wheel brake.

Accordingly, when a failure occurs in the second wheel brake downstream of the cutoff means, the boosted pressure can be immediately regained by the cutoff of the cutoff means and the booster can perform the normal boosting function. Thus, insufficiency of the leg-power can be avoided.

On the other hand, when a failure occurs on the side upstream of the cutoff means, that is, in the boost chamber, the following operation is performed. When a failure occurs in the boost chamber, the fluid pressure in the fluid path in the boost chamber is still lower than the predetermined value even after the cutoff by the cutoff means. In this case, the limiter means is in a state permitting operation of the pressure from raising means. Accordingly, the pressure raising means receives the pressure from the master cylinder at the one end thereof and moves toward the other end, whereby the brake pressure to be applied to the second wheel brake is raised based on the pressure of the master cylinder. Thus, the brakes of all the wheels are effectively operated and the pressure for assuring a predetermined working of the brakes is substantially the same as in the normal operation. In other words, even if the booster is incapable of performing the boosting function, increase of the leg-power is never required.

Thus, according to the present invention, increase of the leg-power is never required if a failure occurs in any portion of the apparatus, irrespective of whether it is upstream or downstream of the cutoff means. Therefore, no limitation is imposed to the weight of a vehicle to which the present invention is to be applied.

These objects and other objects, features, aspects and advantages of the present invention will become more apparent from the following detailed description of the present invention when taken in conjunction with the accompanying drawings.

BRIEF DESCRIPTION OF THE DRAWINGS

FIG. 4 shows the piston 41 in a stop position and FIG. 5 shows the piston 41 in an operation position.

FIG. 7 shows the piston 54 in a stop position and FIG. 8 shows the piston 54 in an operation position.

DESCRIPTION OF THE PREFERRED EMBODIMENTS

Figure 1:
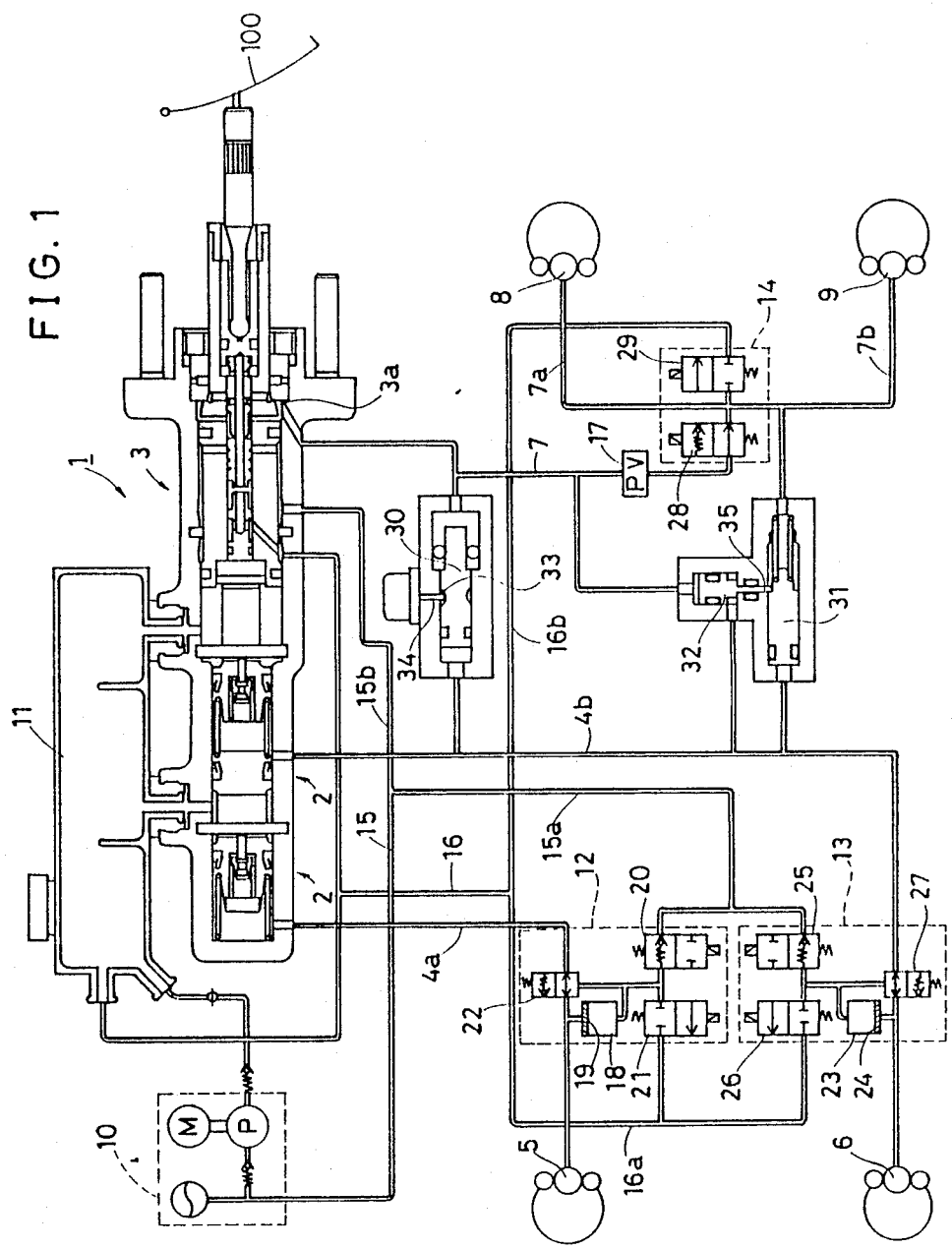
FIG. 1 is a hydraulic circuit diagram of a first embodiment of the present invention.

FIG. 1 is a hydraulic circuit diagram of the first embodiment of the present invention. A brake pressure control apparatus shown in FIG. 1 comprises: a brake unit 1 including a tandem type master cylinder 2 having two chambers, and a booster 3; an auxiliary hydraulic power source 10 including a motor, a pump and an accumulator for sucking a fluid from a reservoir 11 and storing it constantly under a predetermined pressure, which is to be applied as an auxiliary hydraulic pressure; pressure reduction regulating means 12 and 13 for antilock control of front wheel brakes 5 and 6; and pressure reduction regulating means 14 for antilock control of rear wheel brakes 8 and 9.

The master cylinder 2 is driven by a leg-power applied to a brake pedal 100 so that the front wheel brakes 5 and 6 are pressurized. The booster 3 has a boost chamber 3a and when the brake pedal 100 is operated, the booster 3 receives the auxiliary hydraulic pressure from the auxiliary hydraulic power source 10 to produce a boosted pressure in the boost chamber 3a in proportion to the leg-power. The boosted pressure is applied to increase the thrust of the master cylinder 2 caused by the leg-power and it is also applied to the rear wheel brakes 8 and 9.

The pressure reduction regulating means 12 is provided in a fluid path 4a connecting one of the chambers of the master cylinder 2 and one of the front wheel brakes, i.e., the brake 5. The pressure reduction regulating means 13 is provided in a fluid path 4b connecting the other chamber of the master cylinder 2 and the other front wheel brake 6. The pressure reduction regulating means 14 is provided in fluid paths 7, 7a and 7b connecting the boost chamber 3a of the booster 3 and the rear wheel brakes 8 and 9.

The auxiliary hydraulic pressure of the auxiliary hydraulic power source 10 is transmitted to the booster 3 through fluid paths 15 and 15b and it is also transmitted to the pressure reduction regulating means 12 and 13 on the front wheel side through fluid paths 15 and 15a. The fluid discharged from the front-wheel pressure reduction regulating means 12 and 13 returns to the reservoir 11 through fluid paths 16a and 16. The fluid discharged from the rear-wheel pressure reduction regulating means 14 returns to the reservoir 11 through fluid paths 16b and 16.

A proportional reduction valve 17 is provided in the fluid path connecting the boost chamber 3a of the booster 3 and the rear-wheel pressure reduction regulating means 14. The proportional reduction valve 17 reduces an input fluid pressure in proportion to a predetermined value and outputs the reduced pressure, so that brake force is distributed approximately in an ideal proportion.

The front-wheel pressure reduction regulating means 12 on one side comprises a control chamber 18 having two opposing ends, the first one being connected to the fluid path communicating with the front wheel brake 5 and the second one being connected to the fluid path communicating with the auxiliary hydraulic power source 10 and the reservoir 11. It further comprises a pressure reduction piston 19 provided movably in the control chamber 18, an inlet valve 20 provided in a fluid path transmitting the auxiliary hydraulic pressure from the auxiliary hydraulic power source 10 to the second end of the control chamber 18, for regulating an input amount of the fluid into the control chamber, an outlet valve 21 provided in a fluid path discharging the fluid from the second end of the control chamber 18 to the reservoir 11, for regulating an output amount of the fluid, and a pressure-responsive selection valve 22 provided in a fluid path communicating the master cylinder 2 with the first end of the control chamber 18. The pressure reduction piston 19 cuts off flow of the fluid between the two ends of the control chamber 18 and it controls reduction of the brake pressure for the front wheel brake 5 when it moves according to change in the fluid pressure at the second end of the control chamber 18.

In the same manner, the front-wheel pressure reduction regulating means 13 on the other side comprises a control chamber 23, a pressure reduction piston 24, an inlet valve 25, an outlet valve 26, and a pressure-responsive selection valve 27. Those two front-wheel pressure reduction regulating means 12 and 13 have exactly the same-construction and perform the same operation. Therefore, the following description is made only as to the front-wheel pressure reduction regulating means 12 on one side and description of the other front-wheel pressure reduction regulating means 13 is omitted.

The inlet valve 20 in this embodiment is a 2-port 2-position selection valve. When the inlet valve 20 is in a non-conductive state (in which electric power is not supplied), it is pushed by a spring and maintained in a first position as shown in the figure. The inlet valve 20 in the first position permits flow of the fluid from the auxiliary hydraulic power source 10 to the control chamber and forbids the flow in the reverse direction. When the inlet valve 20 is in a conductive state (in which electric power is supplied), it is switched to a second position. The inlet valve 20 in the second position forbids flow of the fluid in both directions.

The outlet valve 21 in this embodiment is a 2-port 2-position selection valve. When it is in the non-conductive state, it is by a spring and maintained in a first position as shown in the figure. The outlet valve 21 in the first position forbids flow of the fluid in the two directions. When the outlet valve 21 is in the conductive state, it permits flow of the fluid from the control chamber 18 to the reservoir 11.

The pressure-responsive selection valve 22 in this embodiment is also a 2-port 2-position selection valve. The position of this valve is changed dependent on the pressure in the fluid path communicating with the second end of the control chamber 18. When the pressure is high, the pressure-responsive selection valve 22 is maintained in a first position as shown in the figure in opposition to the force of the spring. The valve 22 in that state permits flow of the fluid in both of the directions. On the other hand, when the pressure in the fluid path communicating with the second end of the control chamber 18 is lowered, the valve 22 is pushed by the spring and switched to a second position. The valve 22 in that state permits flow of the fluid from the front wheel brake 5 to the master cylinder 2 and forbids flow of the fluid in the reverse direction.

The rear-wheel pressure reduction regulating means 14 comprises an inlet valve 28 and an outlet valve 29. The inlet valve 28 is provided in the fluid path connecting the booster 3 with the rear wheel brakes 8 and 9, while the outlet valve 29 is provided in the fluid path connecting the rear wheel brakes 8 and 9 with the reservoir 11.

The inlet valve 28 in this embodiment is a 2-port 2-position selection valve. When it is in the non-conductive state, it is pushed by a spring and maintained in a first position as shown in the figure. The valve 28 in that state permits flow of the fluid from the booster 3 to the rear wheel brakes 8 and 9. When the inlet valve 28 is in the conductive state, it is switched to a second position. The valve 28 in the second position permits flow of the fluid from the rear wheel brakes 8 and 9 to the booster 3 and forbids flow of the fluid in the reverse direction.

The outlet valve 29 in this embodiment is also a 2-port 2-position selection valve. When it is in the non-conductive state, it is pushed by a spring and maintained in a first position as shown in the figure. The valve 29 in that state forbids flow of the fluid in both of the directions. When it is in the conductive state, it is switched to a second position. The valve 29 in that state permits flow of the fluid from the rear wheel brakes 8 and 9 to the reservoir 11.

Now, operation of the whole apparatus will be described. In the following, control of brake force for the front wheel brakes 5 and 6 will be first described and then control of brake force for the rear wheel brakes 8 and 9 will be described, for convenience sake.

Referring to FIG. 1, when the brake pedal 100 is operated, the fluid pressure in the master cylinder 2 is increased. The increased fluid pressure is applied to the front wheel brake 6 through the fluid path 4a and the pressure-responsive selection valve 22 as well as to the front wheel brake 6 through the fluid path 4b and the pressure-responsive selection valve 27.

When locking of the front wheels is detected, the inlet valves 20 and 25 are brought into the conductive state and the outlet valves 21 and 26 are also brought into the conductive state. Then, the pressure reduction pistons 19 and 24 both move in the control chambers 18 and 23, respectively, to lower the fluid pressure in the fluid paths communicating with the front wheel brakes 5 and 6. When the fluid pressure at the second end of the control chamber 18 becomes lower than a predetermined pressure, the pressure-responsive selection valves 22 and 27 are switched to the second positions to forbid flow of the fluid from the master cylinder 2 to the front wheel brakes 5 and 6. Thus, the pressure reduction pistons 19 and 24 are moved toward the second ends of the control chambers 18 and 23, respectively, to increase the volume of and reduce the pressure of the system including the front wheel brakes 5 and 6, whereby locking of the front wheels is avoided.

When the inlet valves 20 and 25 are in the conductive state and the outlet valves 21 and 26 are in the non-conductive state, the pressure reduction piston 19 is stopped so that the brake pressure for the front wheel brakes 5 and 6 is maintained at a constant value. Then, when the inlet valves 20 and 25 and the outlet valves 21 and 26 are all in the non-conductive state, the apparatus is in a state permitting repressurization.

Next, control of brake force in a dynamic system for the rear wheel brakes 8 and 9 will be described.

In normal operation of the brake pedal 100, the boosted pressure through the booster 3 is applied to the rear wheel brakes 8 and 9 through the fluid path 7, the inlet valve 28 and the fluid paths 7a and 7b. When locking of the rear wheels is detected, the inlet valve 28 and the outlet valve 29 are both brought into the conductive state. In that state, application of the boosted pressure through the booster 3 is stopped by the inlet valve 28, while the fluid in the fluid path communicating with the rear wheel brakes 8 and 9 is discharged to the reservoir 11 through the outlet valve 29 and the fluid paths 16b and 16. As a result, the brake pressure for the rear wheel brakes 8 and 9 is lowered to avoid locking of the rear wheels.

When the inlet valve 28 is in the conductive state and the outlet valve 29 is in the non-conductive state, the brake pressure is maintained at a constant value. When the inlet valve 28 and the outlet valve 29 are both brought into the non-conductive state, the apparatus is in a state permitting repressurization.

The above described brake pressure control apparatus further comprises comparator means 30, pressure raising means 31 and limiter means 32 to take measures against abnormal lowering of the fluid pressure in the fluid path connecting the boost chamber 3a of the booster 3 with the rear wheel brakes 8 and 9. The inlet valves 28 function as cutoff means.

In this embodiment, the comparator means 30 is a differential piston having one end connected to the fluid path 4b communicating with the master cylinder 2 and the other end connected to the fluid path 7 connecting the boost chamber 3a with the rear wheel brakes 8 and 9. When the fluid pressure in the fluid path connecting the boost chamber 3a with the rear wheel brakes 8 and 9 is lower than a predetermined value, the comparator means 30 moves toward the side of the above mentioned other end, that is, rightward in the figure. The comparator means 30 in the form of the differential piston has a cam surface 33. The comparator 30 is further provided with a pin 34 having one end in contact with the cam surface 33. When the comparator means 30 moves toward the side of the above mentioned other end, the pin 34 is pushed upward as it comes out of the cam surface 33. Thus, the movement of the comparator means 34 is detected by the movement of the pin 34. In other words, abnormal lowering of the fluid pressure in the fluid paths between the boost chamber 3a and the rear wheel brakes 8 and 9 is detected by the movement of the switch 34. The cutoff means, that is, the inlet valve 28 is brought into the conductive state dependent on information of the switch 34, whereby communication between the boost chamber 3a and the rear wheel brakes 8 and 9 can be cutoff.

The pressure raising means 31 in this embodiment is a piston having one end connected to the fluid path 4b communicating with the master cylinder 2 and the other end connected to the fluid paths 7a and 7b between the inlet valve 28 and the real wheel brakes 8 and 9. When the pressure raising means 31 receives the pressure from the master cylinder at the one end and moves toward the side of the other end, the fluid in the fluid paths 7a and 7b communicating with the rear wheel brakes 8 and 9 is pressurized. In other words, as a result of the movement of the pressure raising means 31 toward the side of the above mentioned other end, the brake pressure to be applied to the rear wheel brakes 8 and 9 is increased based on the pressure from the master cylinder.

The limiter means 32 in this embodiment is also a piston having one end connected to the fluid path 4b communicating with the master cylinder 2 and the other end connected to the fluid path 7 between the boost chamber 3a and the inlet valve 28. The limiter means 32 in the form of the piston moves to the side of the above mentioned other end, that is, upward in the figure when the fluid pressure in the fluid path 7 between the boost chamber 3a and the inlet valve 28 is lower than a predetermined value. The limiter means 32 has a stopper 35 on the side of the above mentioned one end, which is to be engaged with the pressure raising means 31 to forbid movement of the pressure raising means 31. As shown, when the stopper 35 is engaged with the pressure raising means 31, the pressure raising means 31 cannot be moved. If the limiter means 32 moves upward from the position shown in the figure, the engagement between the stopper 35 and the pressure raising means 31 is cancelled and the pressure raising means 31 moves, toward the side of its other end, that is, rightward in the figure.

Now, description will be made of operation in case of abnormal lowering of the fluid in the fluid paths 7, 7a and 7b connecting the boost chamber 3a of the booster 3 with the rear wheel brakes 8 and 9.

When the fluid pressure in the fluid paths 7, 7a and 7b connecting the boost chamber 3a and the rear wheel brakes 8 and 8 becomes lower than a predetermined value the comparator means 30 moves rightward in the figure. The movement of the comparator means 30 is detected by the switch 34 and thus abnormal lowering of the fluid pressure is detected. Then, the inlet valve 28 as the cut off means is brought into the conductive state to cut off flow of the fluid from the boost chamber 3a to the rear wheel brakes 8 and 9.

If a failure occurs on the side of the boost chamber 3a, the fluid pressure in the fluid path 7 connecting the boost chamber 3a with the inlet valve 28 is still lower than the predetermined value. Consequently, the limiter means 32 moves toward the boost chamber 3a and the engagement between the stopper 35 and the pressure raising means 31 is cancelled. The pressure raising means 31 receives the pressure from the master cylinder at the above mentioned one end and moves toward the other end, thereby to pressurize the fluid in the fluid paths 7a and 7b connecting the inlet valve 28 with the rear wheel brakes 8 and 9. Thus, even if a failure occurs in the boost chamber 3a, the brake pressure for the rear wheel brakes 8 and 9 can be increased based on the pressure from the master cylinder.

On the other hand, if a failure occurs on the side of the inlet valve 28 and the rear wheel brakes 8 and 9, the fluid pressure in the fluid path 7 connecting the boost chamber 3a with the inlet valve 28 is increased to a normal value by cutoff of the inlet valve 28. Thus, the limiter means 32 does not move upward in the figure and the engaging state between the stopper 35 and the pressure raising means 31 is maintained. Thus, the booster 3 performs the normal boosting function and insufficiency of the leg-power does not occur.

Figure 2:
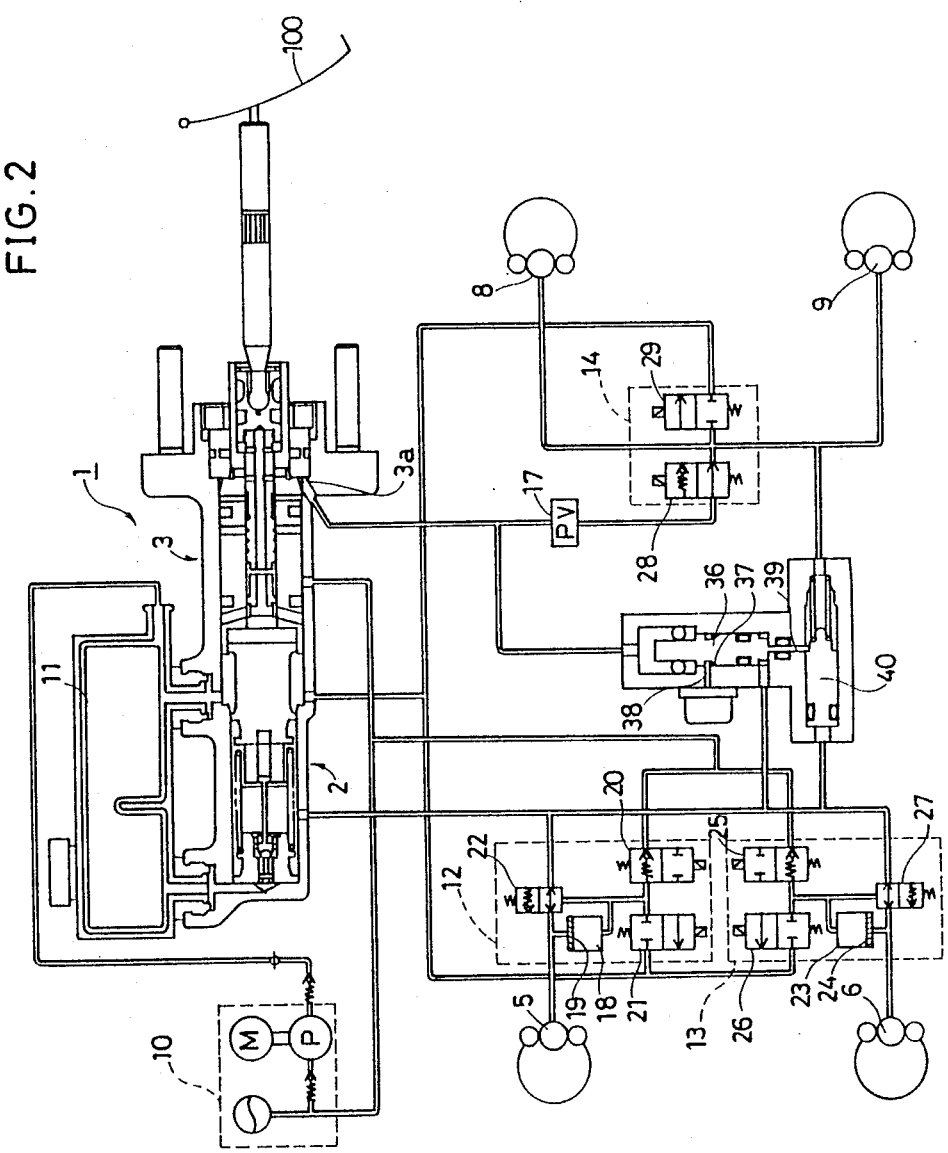
FIG. 2 is a hydraulic circuit diagram of a second embodiment of the present invention.

FIG. 2 is a hydraulic circuit diagram of the second embodiment of the present invention. In the following description of the second embodiment, only the features different from those of the first embodiment will be explained.

In the first embodiment shown in FIG. 1, the master cylinder 2 is of the tandem type, while in the second embodiment, the master cylinder 2 is of a single-chamber type. The comparator means and the limiter means are formed by a single piston 36. The pressure raising means 40 is in the form of a piston, as in the first embodiment. The piston 36 has a cam surface 37, with which an end of a switch 38 is to be in contact, in the same manner as in the first embodiment. In addition, the piston 36 has a stopper 39 to be engaged with the pressure raising means 40 to forbid movement of the means 40, similarly to the first embodiment.

Description is now made of operation of the second embodiment. When the fluid pressure in the fluid path connecting the boost chamber 3a with the rear wheel brake 8 and 9 becomes lower than a predetermined value, the piston 36 moves upward in the figure. The movement of the piston 36 is detected by the switch 38 and the inlet valve 28 is brought into the conductive state. As a result, flow of the fluid from the boost chamber 3a to the rear wheel brakes 8 and 9 is cut off. In this case, if a failure occurs on the side of the boost chamber 3a, the piston 36 is maintained in the above mentioned position. Accordingly, the engagement between the stopper 39 and the pressure raising means 40 is cancelled. Thus, the pressure raising means 40 receiving the pressure from the master cylinder at one end thereof moves to the side of the other end, so that the brake pressure to be applied to the rear wheel brakes 8 and 9 is increased based on the pressure from the master cylinder.

On the other hand, if a failure occurs on the side of the fluid paths connecting the inlet valve 28 with the rear wheel brakes 8 and 9, the fluid pressure in those fluid paths is raised to a normal value immediately after the inlet valve 28 is brought into the conductive state. Thus, the piston 36 is maintained in the lower position in the figure and the engagement between the stopper 39 and the pressure raising means 40 is maintained.

Figure 3:
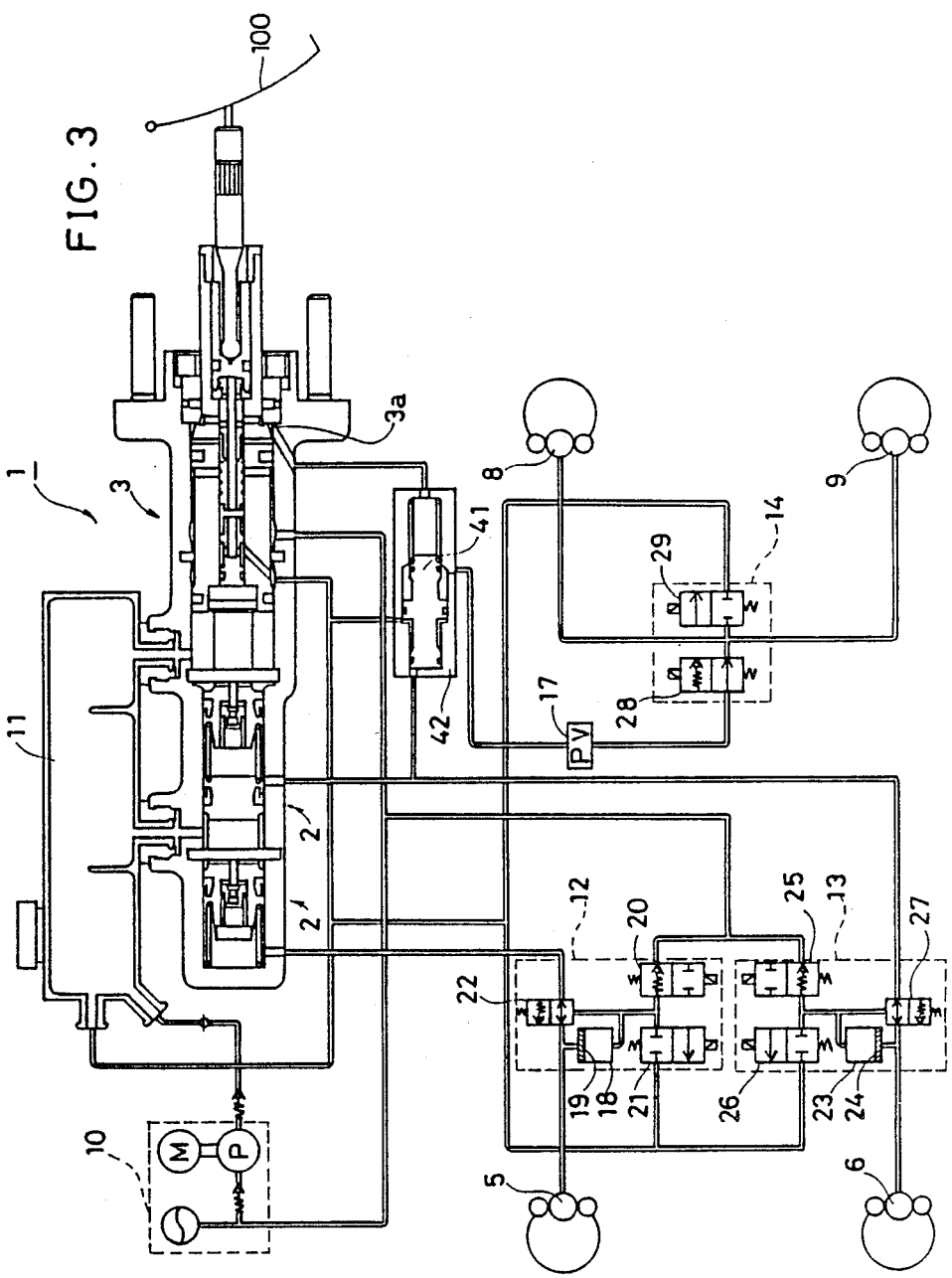
FIG. 3 is a hydraulic circuit diagram of a third embodiment of the present invention.

FIG. 3 is a hydraulic circuit diagram of the third embodiment of the present invention. In the description of this third embodiment also, only the features different from the above embodiments will be explained.

In the third embodiment, the comparator means, the cutoff means, the pressure raising means and the limiter means are formed by a single piston 41. In the above described embodiments, the inlet valve 29 as the cutoff means is provided to cut off the fluid paths connecting the boost chamber 3a with the rear wheel brakes 8 and 9 when the fluid pressure in those fluid paths is abnormally lowered. On the other hand, in the third embodiment of FIG. 3, the cutoff means for performing such functions is a valve provided between the piston 41 and a casing 42 for containing the piston 41.

Figure 4:
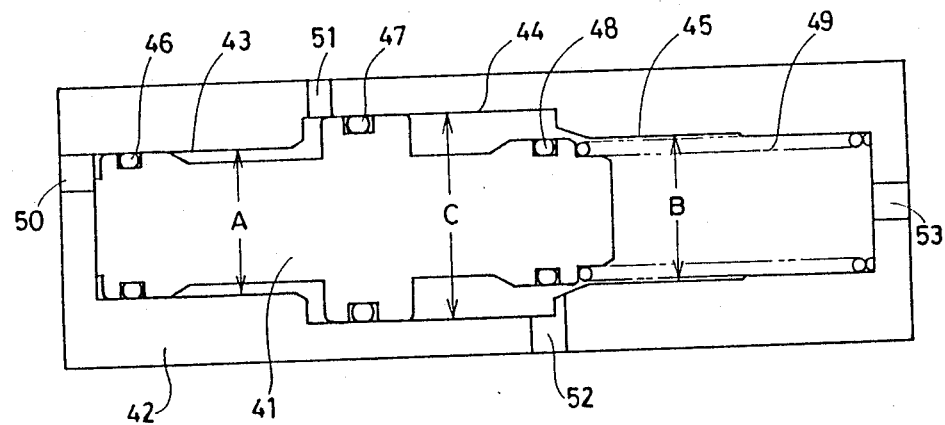
FIGS. 4 and 5 are enlarged sectional views of a piston 41 and a casing 42 used in the third embodiment. Particularly.
Figure 5:
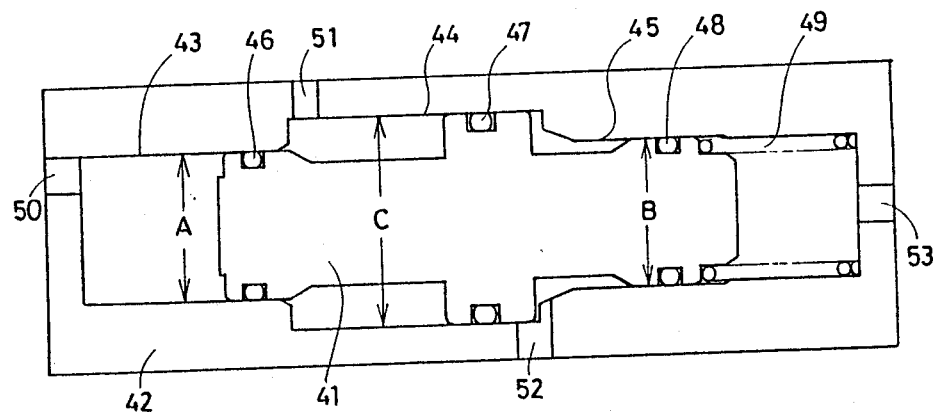

FIGS. 4 and 5 show details of the piston 41 and the casing 42. FIG. 4 shows a state in which the piston 41 is in a stop position and FIG. 5 shows a state in which the piston 41 is in an operation position.

The casing 42 has a first bore 42, a second bore 44 and a third bore 45 as shown. In association therewith, the piston 41 has first liquid seal means 46, second liquid seal means 47 and third liquid seal means 48 for maintaining a liquid seal state with respect to the first bore 43, the second bore 44 and the third bore 45, respectively. The third liquid seal means 48 serves also as valve means. In FIGS. 4 and 5, the diameter of the first bore 43 is shown by A, that of the second bore 44 is shown by C and that of the third bore 45 is shown by B. The diameter C is the largest.

Further, as shown, ports 50, 51, 52 and 53 are formed in the casing 42. The pressure from the master cylinder 2 is applied to the port 50. The port 51 communicates with the reservoir 11. The port 52 communicates with the rear wheel brakes 8 and 9. The port 53 communicates with the boost chamber 3a. The piston 41 is pushed toward the side of the master cylinder 2 by a spring 49. When the piston 41 is in the stop position as shown in FIG. 4, the third liquid seal means 48 is located apart from the third bore 45. In that case, the boost chamber 3a is in a state communicating with the rear wheel brakes 8 and 9.

When the fluid pressure in the fluid paths connecting the boost chamber 3a with the rear wheel brakes 8 and 9 is a normal value, the piston 41 is maintained in the stop position shown in FIG. 4. In this state, the rear wheel brakes 8 and 9 can be pressurized by the boosted pressure through the boost chamber 3a.

When the fluid pressure in the fluid paths connecting the boost chamber 3a with the rear wheel brakes 8 and 9 becomes lower than a predetermined value, the piston 41 moves rightward in FIG. 4. As a result, the liquid seal state is maintained between the third liquid seal means 48 and the third bore 45 and flow of the fluid from the boost chamber 3a to the rear wheel brakes 8 and 9 is cut off.

If a failure occurs in the rear wheel brake 8 or 9 in that state, the boosted pressure through the boost chamber 3a regains a predetermined value. Therefore, if A=B, the movement of the piston 41 is stopped and the leg-power is caused to regain a predetermined value by the boosting function.

On the other hand, if a failure occurs in the boost chamber 3a, the piston 41 further moves rightward in the figure due to the pushing action of the pressure from the master cylinder applied to the area corresponding to the diameter A. As a result, a closed circuit including the rear wheel brakes 8 and 9 is pressurized by a force based on a difference in the areas corresponding to C - B. FIG. 5 shows the state in which the piston 41 is moved to the right position.

Figure 6:
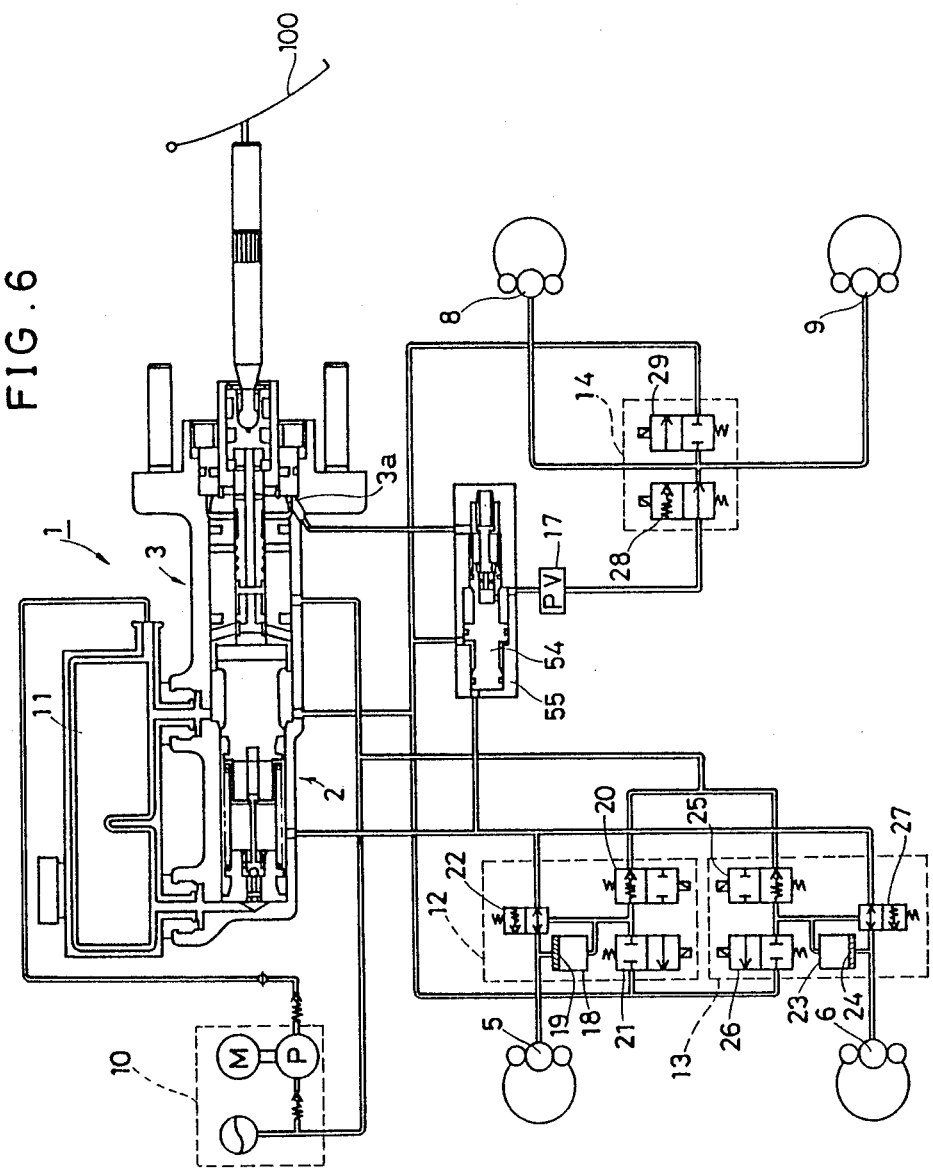
FIG. 6 is a hydraulic circuit diagram of a fourth embodiment of the present invention.

FIG. 6 is a hydraulic circuit diagram of the fourth embodiment of the present invention. Also in the description of this embodiment, only the features different from the above embodiments will be explained.

In the fourth embodiment of FIG. 6, the comparator means, the pressure raising means and the limiter means are formed by a single piston 54. The cutoff means is provided in a casing 55 containing the piston 54.

Figure 7:
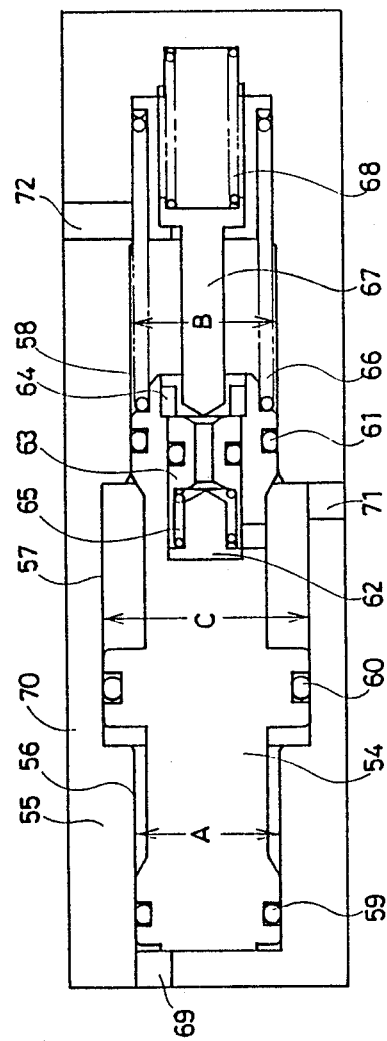
FIGS. 7 and 8 are enlarged sectional views showing a structure of a portion associated with a piston 54 and a casing 55 used in the fourth embodiment. Particularly.
Figure 8:
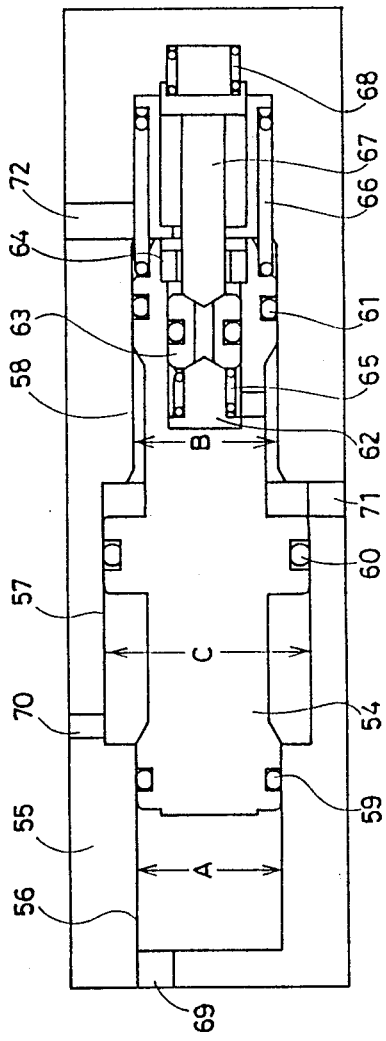

FIGS. 7 and 8 show details of a portion related with the piston 54 and the casing 55. FIG. 7 shows a state in which the piston 54 is in a stop position and FIG. 8 shows a state in which the piston 54 is in an operation position.

The casing 55 has a first bore 56 of a diameter A, a second bore 57 of a diameter C and a third bore 58 of a diameter B. The piston 54 has first liquid seal means 54, second liquid seal means 60 and third liquid seal means 61 for keeping a liquid seal state in association with the first bore 56, the second bore 57 and the third bore 58, respectively. The diameter C is the largest.

As shown, the casing 55 has a port 69 communicating with the master cylinder 2, has a port 70 communicating with the reservoir 11, a port 71 communicating with the rear wheel brakes 8 and 9, and a port 72 communicating with the boost chamber 3a. In addition, as shown, a valve body 62, a movable valve seat 63 and a sleeve 64 are incorporated in the piston 54. A spring 65 is disposed between the valve body 62 and the movable valve seat 63 to constantly push the movable valve seat 63 rightward in the figures. The sleeve 64 is fixed to the piston 54 to prevent the movable valve seat 63 from being moved out of the piston 54. A valve body 67 constantly pushed toward the piston 54 by a spring 68 is contained in the third bore 58 of the casing 55. Further, a spring 66 for constantly pushing the piston 54 toward the master cylinder is contained in the third bore 58.

If the fluid pressure in the fluid paths connecting the boost chamber 3a with the rear wheel brakes 8 and 9 is a normal value, the piston 54 is maintained in the stop position shown in FIG. 7. In that position, the boost chamber 3a is in a state communicating with the rear wheel brakes 8 and 9. Thus, the rear wheel brakes 8 and 9 can be pressurized by the boosted pressure through the boost chamber 3a.

When the fluid pressure in the fluid paths connecting the boost chamber 3a with the rear wheel brakes 8 and 9 becomes lower than a predetermined value, the piston 54 moves rightward in the figures. As a result, the valve body 67 and the movable valve seat 63 are brought into a closed state and then the movable valve seat 63 and the valve body 62 are brought into a closed state. Consequently, flow of the fluid of the boost chamber 3a to the rear wheel brakes 8 and 9 is cut off.

If a failure occurs in the rear wheel brake 8 or 9 in that state, the boosted pressure regains to a normal value. Therefore, if A=B, the movement of the piston 54 is stopped and the leg-power is caused to regain to a determined value by the boosting function.

On the other hand, if a failure occurs in the boost chamber 3a, the piston 54 moves rightward due to the pressure from the master cylinder applied to an area corresponding to the diameter A. As a result, the closed circuit including the rear wheel brakes 8 and 9 is pressurized by a force based on a difference in the areas corresponding to C - B.

In the foregoing, the present invention has been described in connection with the four embodiments. However, those embodiments are chosen by way of illustration and example only and are not be taken by way of illustration. Therefore, various changes and modifications can be made without departing from the scope of the invention as defined by the following claims.

What is claimed is:

1. A brake pressure control apparatus comprising:
   a master cylinder driven by a leg-power applied to a brake pedal, for storing a pressure to a first wheel brake,
   an auxiliary hydraulic power source for sucking a fluid from a reservoir and storing the fluid constantly under a pressure, to be applied as an auxiliary hydraulic pressure,
   a booster having a boost chamber, connecting said boost chamber to said reservoir when said brake pedal is not operated, and producing a boosted pressure in said boost chamber in proportion to the leg-power upon receipt of the auxiliary hydraulic pressure from said auxiliary hydraulic power source when said brake pedal is operated to enable the boosted pressure to increase thrust of said master cylinder caused by the leg-power and to pressurize a second wheel brake,
   comparator means having one end connected to a fluid path communicating with said master cylinder and the other end connected to a fluid path between said boost chamber and said second wheel brake, for comparing hydraulic pressures in both of the fluid paths to determine whether the fluid pressure in the fluid path between said boost chamber and said second wheel brake is lower than a predetermined value,
   cutoff means disposed in the fluid path between said boost chamber and said second wheel brake, for cutting off flow of the fluid from said boost chamber to said second wheel brake when it is determined that the fluid pressure in the fluid path between said boost chamber and said second wheel brake is lower than the predetermined value,
   pressure raising means having one end connected to the fluid path communicating with said master cylinder and the other end connected to a fluid path between said cutoff means and said second wheel brake, for raising a brake pressure to be applied to said second wheel brake based on a pressure from said master cylinder when it receives the pressure from said master cylinder at the one end and moves toward the other end, and
   limiter means for limiting operation of said pressure raising means to enable said pressure raising means to operate only when the fluid pressure in the fluid path connecting said boost chamber with said cutoff means is lower than the predetermined value at the time of cutoff by said cutoff means.

2. A brake pressure control apparatus in accordance with claim 1, wherein said comparator means is a differential piston for receiving the pressure from said master cylinder at the one end and the boosted pressure at the other end.

3. A brake pressure control apparatus in accordance with claim 2, wherein said differential piston has a cam surface, and
   movement of said differential piston is detected by movement of a switch having one end to be in contact with said cam surface.

4. A brake pressure control apparatus in accordance with claim 3, wherein said cutoff means is an electromagnetic valve which permits flow of the fluid from said boost chamber to said second wheel brake when it is in a non-conductive state and forbids the flow of the fluid from said boost chamber to said second wheel brake when it is in a conductive state.

5. A brake pressure control apparatus in accordance with claim 3, wherein said cutoff means is a valve provided between said differential piston and a casing for containing said differential piston.

6. A brake pressure control apparatus in accordance with claim 5, wherein said pressure raising means is a piston.

7. A brake pressure control apparatus in accordance with claim 6, wherein
   said limiter means is a piston having one end connected to the fluid path communicating with said master cylinder and the other end connected to the fluid path between said boost chamber and said cutoff means,
   said limiter means moves toward the other end when the fluid pressure in the fluid path between said boost chamber and said cutoff means is lower than the predetermined value, and
   said pressure raising means is enabled to operate only when said limiter means moves toward the other end.

8. A brake pressure control apparatus in accordance with claim 7, wherein
   said limiter means has a stopper at said one end, which is to be engaged with said pressure raising means to forbid movement of said pressure raising means, and
   said limiter means moves toward said other end when the fluid pressure in the fluid path between said boost chamber and said cutoff means is lower than the predetermined value at the time of cutoff by said cutoff means, thereby to cancel the engagement between said stopper and said pressure raising means.

9. A brake pressure control apparatus in accordance with claim 1, wherein said comparator means and said limiter means are formed by a single piston.

10. A brake pressure control apparatus in accordance with claim 1, wherein said comparator means, said pressure raising means and said limiter means are formed by a single piston.

11. A brake pressure control apparatus in accordance with claim 1, wherein said comparator means, said cutoff means, said pressure raising means and said limiter means are provided within a single casing.

* * * * *